June 10, 1924.
C. F. BOOSINGER
1,497,205
WAVE MOTOR
Filed June 14, 1922   3 Sheets-Sheet 1
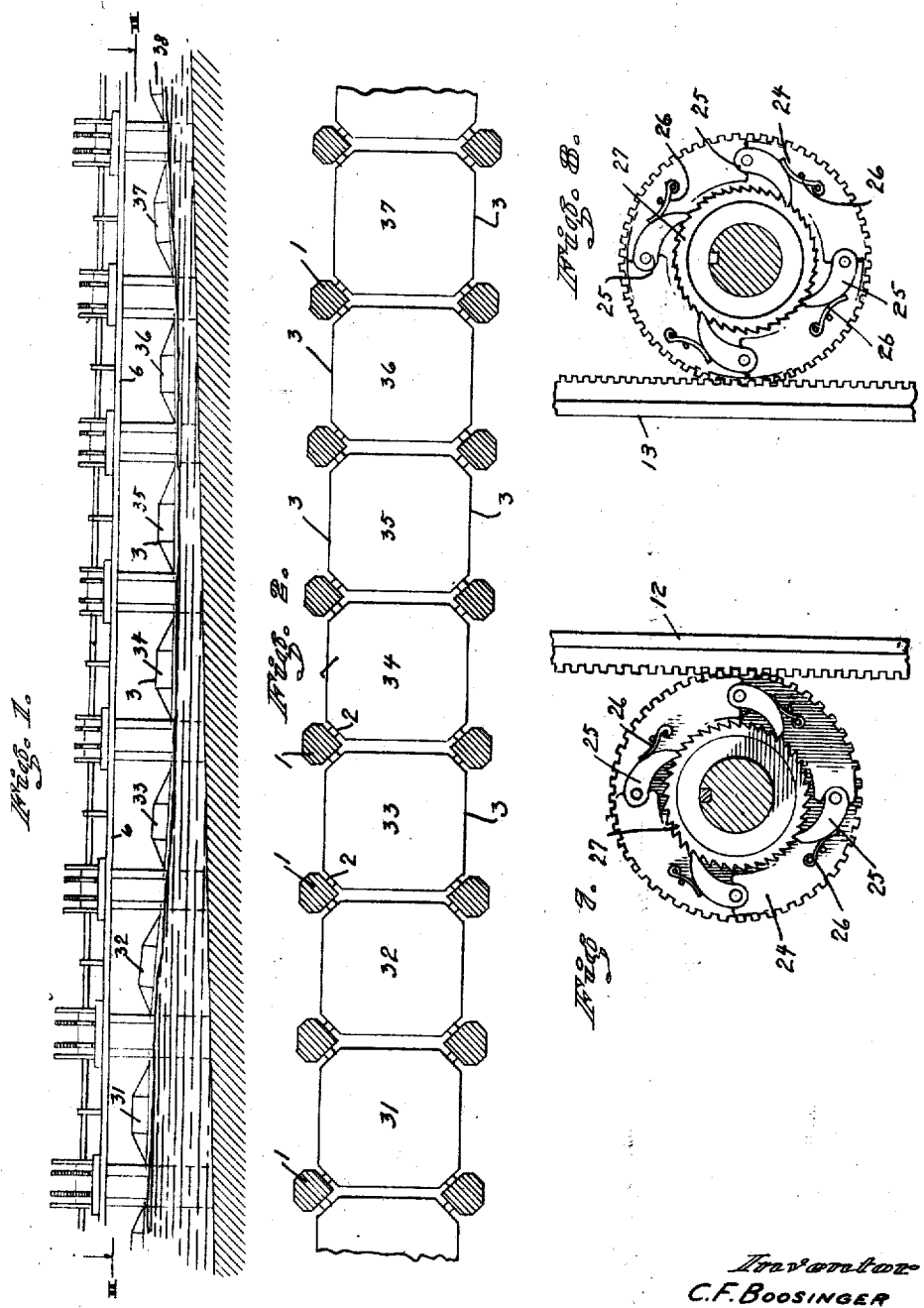
Inventor
C.F. Boosinger
By
Attorneys.

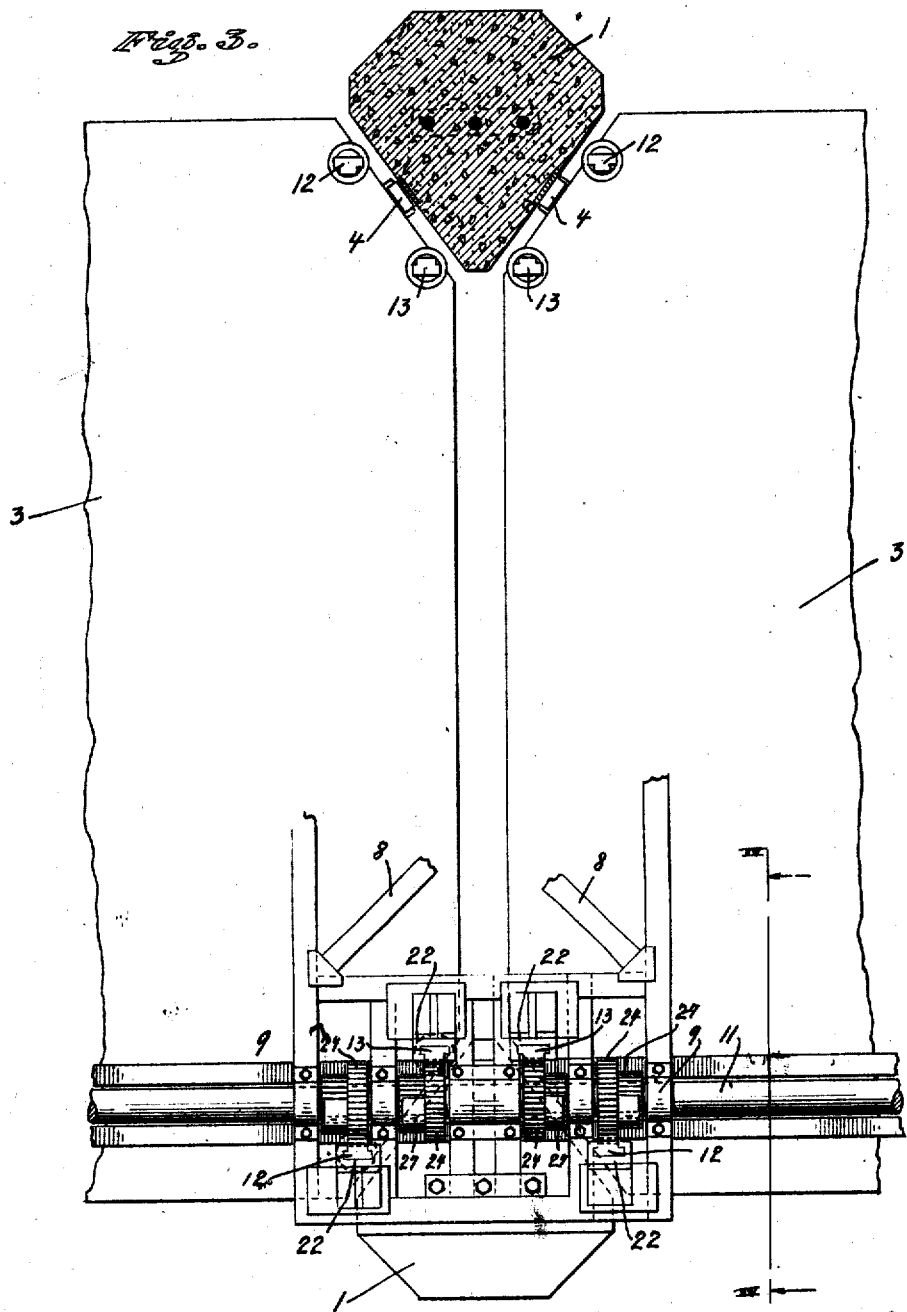

June 10, 1924.
C. F. BOOSINGER
WAVE MOTOR
Filed June 14, 1922
1,497,205
3 Sheets-Sheet 3
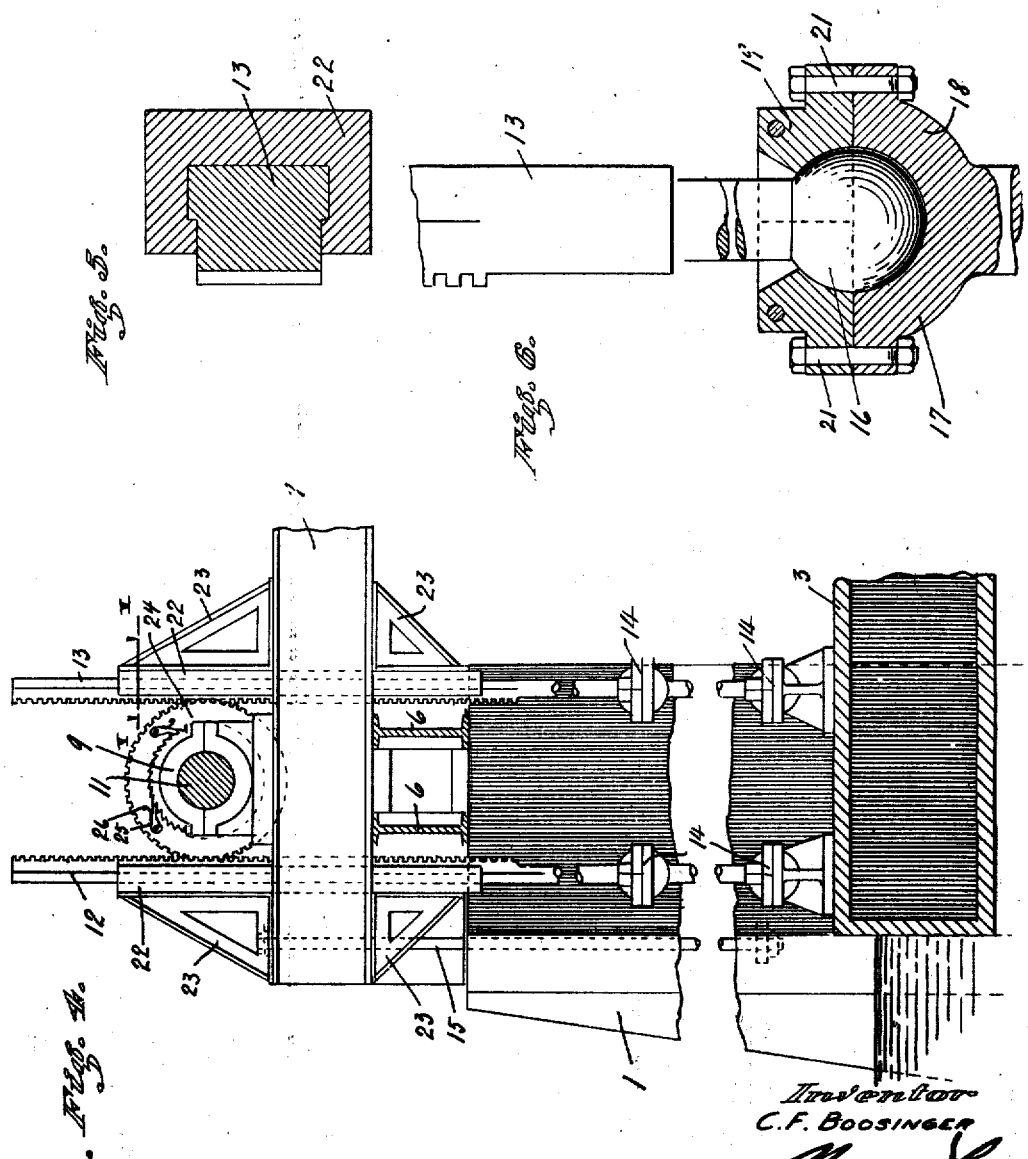

Patented June 10, 1924.

1,497,205

UNITED STATES PATENT OFFICE.

CHARLES BOOSINGER, OF SAN LUIS OBISPO, CALIFORNIA.

WAVE MOTOR.

Application filed June 14, 1922. Serial No. 568,201.

*To all whom it may concern:*

Be it known that I, CHARLES F. BOOSINGER, a citizen of the United States, and a resident of San Luis Obispo, county of San Luis Obispo, and State of California, have invented a new and useful Wave Motor, of which the following is a specification.

The present invention relates to improvements in wave motors and its particular object is to provide a motor of the character described in which a plurality of floats rising and falling with the waves co-operate in imparting uni-directional rotary motion to a shaft, which latter thus receives a large number of impulses all of which operate in the same direction. A further object of the invention is to render this rotary motion as uniform as possible by arranging a series of floats in such a manner that they cover a full wave length or a plurality of wave lengths, so that the shaft will receive impulses all the time, there being no intermission as there would be if only one float were employed. A further object of the invention is to provide a practical, operative device adapted to work 24 hours a day and independent of the rise and fall of the water due to ebb and flow. A further object of the invention is to provide a device that is extremely simple in character, self-adjusting and requiring little or no attention.

With these objects in view I have illustrated the preferred form of my invention in the accompanying drawings, in which Figure 1 represents a side elevation of my device; Figure 2 a cross section through the same along line 2—2 of Figure 1; Figure 3 an enlarged detail plan view of an operative portion of my device; Figure 4 a vertical cross section along line 4—4 of Figure 3; Figure 5 a cross section along line 5—5 of Figure 4; Figure 6 a sectional detail view of a universal joint; Figures 7 and 8 detail views illustrating the transmission of power from vertically moving racks to a rotary shaft. While I have shown only the preferred form of the invention I wish to have it understood that various changes or modifications may be made within the scope of the claims hereto attached without departing from the spirit of the invention.

Two rows of piers (1) are firmly anchored in the bottom of the sea in any suitable manner, preferably in the arrangement shown in Figure 2, although a different arrangement might be selected in the application of the principles of the invention. The piers are so arranged that each four of them form a square adapted to engage the four flattened corners (2) of a float (3), which latter is of square cross-section and frictionally engages the piers through the rollers (4) so as to be capable of vertical sliding motion. A plurality of floats are alined in this manner and the best results will be obtained when a line of floats is co-extensive with the ordinary wave length or with a plurality of wave lengths.

The piers are connected along their top ends by means of strong metal beams (6) which bind the whole structure into one firm unit. Superimposed on these beams and secured to the piers by strong bolts (15) are transverse metal frames (7) made of I-beams or channel irons, one frame resting above each pair of piers. These frames are substantially rectangular in form and are reinforced by proper braces (8). They support, in suitable bearings (9), two longitudinal shafts (11), each disposed above a row of piers and extending throughout the length of the device. These shafts constitute the main drive shafts of my invention and power may be taken from the same in any suitable manner not shown in the drawing, the main object of the present invention being to transform the lifting power of the waves in uniform rotary motion of the shafts.

From each corner of the floats rise two rack beams (12) and (13) arranged in such a manner as to pass one of the shafts on opposite sides of the same. Each rack beam is provided with two universal joints (14) shown in detail in Figure 6 and comprising a ball (16) and a socket (17), the latter comprising a body member (18) and a head (19) adapted to be secured thereto by the bolts (21). The joints allow of rocking motion of the float and permit the upper ends of the rack beams to be slidably secured in rigid vertical guides (22), A T of the rack beam engaging a T-slot in the guides, which latter are secured in the frames by suitable brackets (23). Each rack beam engages a gear wheel (24) rotatably mounted on the shaft (11) and adapted to transmit rotary motion to the same by means of a plurality of pawls (25) forced into engagement, by means of spring (26), with a ratchet (27) which is keyed to the shaft. Since the pawl and ratchet arrangements for each pair of rack beams are pointed in opposite directions as shown in Figures 7 and 8, one rack beam is operative when the float rises and idles when the float falls, while the other beam is operative when the float falls and idles when the float rises, both rack beams turning the shaft in the same direction.

The operation of the device will be readily understood from the foregoing description. Figure 1 shows the general arrangement of the floats as extending throughout one wave length. Assuming that the wave moves from left to right, the floats 31, 32, 33 and 34 will rise and, confining ourselves to one of the shafts, will tend to rotate the shaft, through the rack beams (12) for instance, in one direction, say clockwise. They will not all act simultaneously, but in impulses, each impulse overlapping the preceding and the succeeding one. The corresponding rack beams (13) of these floats will be inoperative due to the fact that their respective pawl and ratchet arrangements are inoperative. The floats (35), (36), (37) and (38) are falling at the same time and also tend to rotate the shaft clockwise in overlapping impulses through their respective rack beams (13), while their rack beams (12) remain inoperative. In this manner there will be continuously overlapping impulses, all co-operating in rotating the shaft in one direction. The other shaft may be arranged to turn in the same or in the opposite direction.

It should be understood that the piers may be arranged in different positions and that more than two rows may be provided with a corresponding number of lines of floats and shafts. Since the power developed by the falling float must be substantially equal to that of the rising float the impulses caused by the falling float must be substantially equal to those caused by the rising floats. The rise and fall of the water due to the tides does not interfere with the operativeness of my device, since the rack beams may be made long enough to operatively engage the gear wheels at high as well as at low water level.

I claim:

1. In a wave motor, two parallel rows of piers arranged to confine a float between each four piers with freedom of vertical motion, with tapered tongues of the piers extending into spaces formed between cut-off corners of the floats, a main horizontal shaft supported over the tongues of each row of piers, two shafts rising from each corner of each float so as to straddle the main shaft and means for transmitting rotary motion to the main shaft from one float shaft as the float rises and from the other float shaft as the float falls.

2. In a wave motor, a float presenting diagonal corner faces, a plurality of piers confining the float to vertical motion presenting diagonal faces parallel to and in confronting relation with the corner faces of the float, a main shaft supported over two piers in intersecting relation with the confronting faces, two shafts rising from each corner of the float so as to straddle the main shaft and means for transmitting rotary motion to the main shaft from one of the float shafts as the float rises and from the other float shaft as the float falls.

CHARLES F. BOOSINGER.